US009436727B1

(12) United States Patent  
Zlatnik

(10) Patent No.: US 9,436,727 B1  
(45) Date of Patent: Sep. 6, 2016

(54) METHOD FOR PROVIDING AN INTEGRATED MACRO MODULE

(71) Applicant: Pavel Zlatnik, Prague (CZ)

(72) Inventor: Pavel Zlatnik, Prague (CZ)

(73) Assignee: CA, Inc., New York, NY (US)

( * ) Notice: Subject to any disclaimer, the term of this patent is extended or adjusted under 35 U.S.C. 154(b) by 336 days.

(21) Appl. No.: 13/854,713

(22) Filed: Apr. 1, 2013

(51) Int. Cl.
*G06F 17/30* (2006.01)

(52) U.S. Cl.
CPC .............................. *G06F 17/30424* (2013.01)

(58) Field of Classification Search
CPC ................................................ G06F 17/30424
See application file for complete search history.

(56) References Cited

U.S. PATENT DOCUMENTS

| | | | | |
|---|---|---|---|---|
| 5,893,916 | A * | 4/1999 | Dooley | G06F 17/2264 715/234 |
| 5,903,859 | A * | 5/1999 | Stone et al. | 704/8 |
| 7,167,870 | B2 * | 1/2007 | Avvari et al. | 717/124 |
| 7,650,355 | B1 * | 1/2010 | Davis | G06F 17/30014 715/202 |
| 2003/0056192 | A1 * | 3/2003 | Burgess | 717/100 |
| 2003/0115552 | A1 * | 6/2003 | Jahnke | G09F 9/4448 715/201 |
| 2004/0031015 | A1 * | 2/2004 | Ben-Romdhane et al. | 717/107 |
| 2004/0230616 | A1 * | 11/2004 | Kruy et al. | 707/104.1 |
| 2004/0267756 | A1 * | 12/2004 | Bayardo et al. | 707/10 |
| 2005/0086216 | A1 * | 4/2005 | Davis | G06F 17/30882 |
| 2005/0262056 | A1 * | 11/2005 | Hamzy et al. | 707/3 |
| 2006/0031208 | A1 * | 2/2006 | Wu et al. | 707/3 |
| 2006/0095400 | A1 * | 5/2006 | Morita et al. | 707/1 |
| 2007/0015118 | A1 * | 1/2007 | Nickell | G09B 7/02 434/118 |
| 2007/0294264 | A1 * | 12/2007 | Bayardo et al. | 707/10 |
| 2007/0299825 | A1 * | 12/2007 | Rush et al. | 707/3 |
| 2009/0150431 | A1 * | 6/2009 | Schmidt | G06F 17/30595 |
| 2010/0056114 | A1 * | 3/2010 | Roundtree | G09B 7/02 455/414.1 |
| 2012/0159434 | A1 * | 6/2012 | Dang | G06F 8/751 717/120 |

OTHER PUBLICATIONS

"Oracle User Productivity Kit In-Application Support Software Development Kit Data Sheet," Oracle Corporation, published 2011, available at http://www.oracle.com/us/products/applications/user-productivity-kit/oracleupkpro-11-0-sdk-ds-1367674.pdf (searched on Jul. 1, 2013).

"Oracle User Productivity Kit Data Sheet," Oracle Corporation, published 2012, available at http://www.oracle.com/us/products/applications/user-productivity-kit/065061.pdf (searched on Jul. 1, 2013).

* cited by examiner

*Primary Examiner* — Apu Mofiz  
*Assistant Examiner* — Jared Bibbee  
(74) *Attorney, Agent, or Firm* — Baker Botts L.L.P.

(57) ABSTRACT

Methods include receiving a request to access an integrated macro module, wherein the integrated macro module is integrated into an application. Methods include presenting an option to search for a macro. When the option to search for the macro is selected, methods include transmitting a message, wherein the message asks for one or more search terms corresponding to the macro. Methods include receiving the one or more search terms. Methods include identifying a macro associated with at least one of the one or more search terms that is stored in an accessible repository. Methods include presenting the identified macro. Methods include recording a macro. Methods include presenting an option to share a macro. When the option to share the macro is selected, methods include storing the macro in a public repository. When the option to share the macro is not selected, methods include storing the macro in a local repository.

21 Claims, 11 Drawing Sheets

METHOD FOR PROVIDING AN INTEGRATED MACRO MODULE

BACKGROUND

The present disclosure relates to computer tutorials and, more specifically, to a system and method for providing an integrated macro module.

Existing computing systems may provide a user with a tutorial or help feature. This tutorial feature may be a module that allows the user to view content that is stored locally or remotely. The content may be electronic versions of documents that are in one or more electronic file formats. The user may use these documents to understand how to use an application or an object of the application. The user may also want to use other content such as macros to understand how to use the application, but existing systems may be limited to providing access to electronic versions of documents. Moreover, existing systems may not allow the user to make or create new content and to share content.

BRIEF SUMMARY

According to an aspect of the present disclosure, a method may include presenting an integrated macro module within an application, in which the integrated macro module is integrated into the application. The method may further include receiving one or more search terms. The method may further include identifying, via a search element of the integrated macro module, a particular macro associated with at least one of the one or more search terms and stored in an accessible repository in response to receiving a request to search for a macro. The method may further include presenting, via the search element, the particular macro.

According to another aspect of the present disclosure, a method may include receiving one or more further search terms. The method may further include recording, via a record element of the integrated macro module, a macro in response to receiving a request to record the macro. The method may also include associating, via the record element, the macro with the one or more further search terms. The method may further include storing, via a publish element of the integrated macro module, the macro and the one or more further search terms in a local repository. The method may also include storing, via the publish element, the macro and the one or more further search terms in a public repository in response to receiving a request to share the macro.

Other objects, features, and advantages will be apparent to persons of ordinary skill in the art from the following detailed description and the accompanying drawings.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
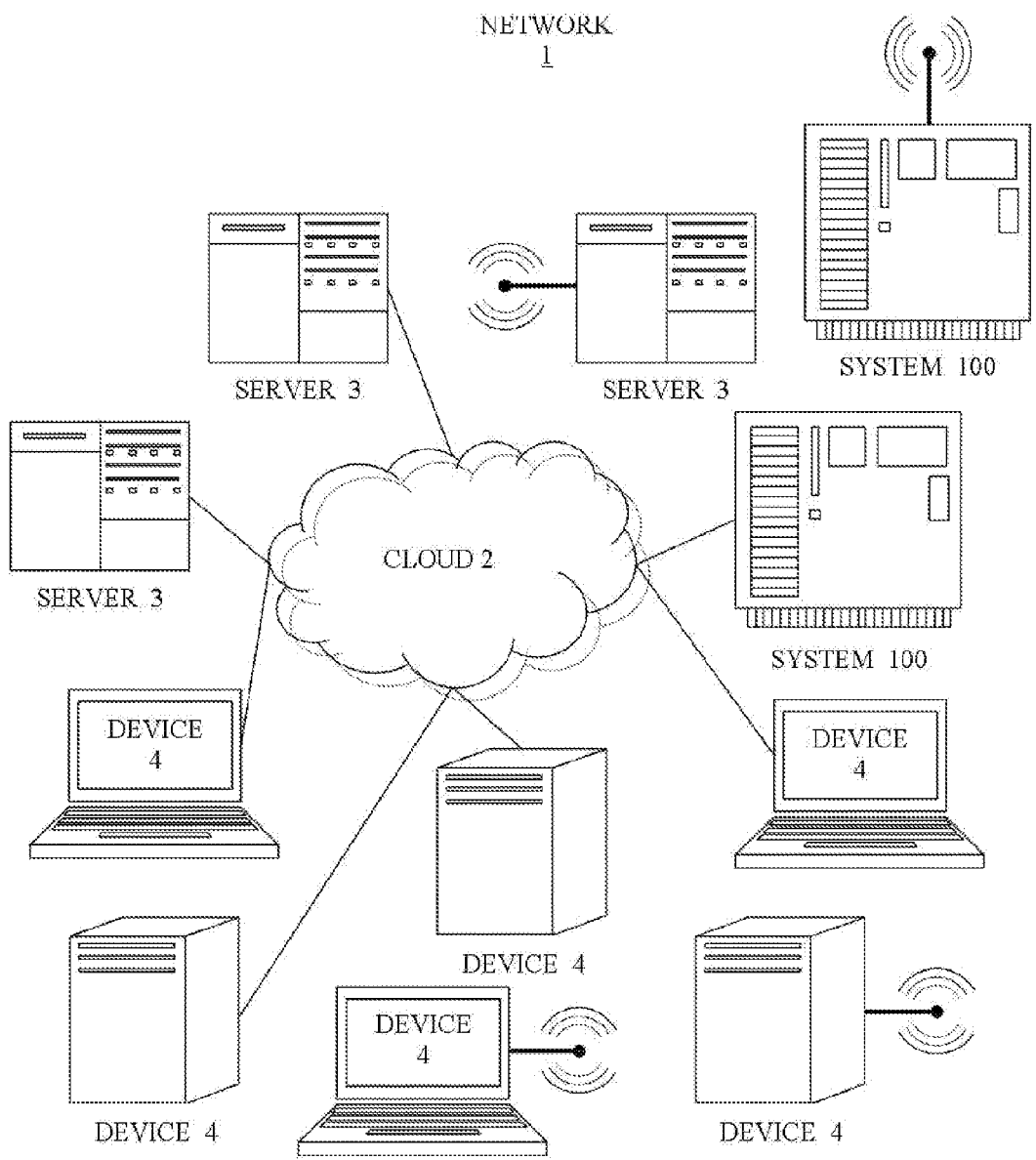
FIG. 1 is a schematic representation of a network for a user to access an integrated macro module.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or in a combined software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would comprise the following: a portable computer diskette, a hard disk, a random access memory ("RAM"), a read-only memory ("ROM"), an erasable programmable read-only memory ("EPROM" or Flash memory), an appropriate optical fiber with a repeater, a portable compact disc read-only memory ("CD-ROM"), an optical storage device, a magnetic storage device, or any suitable combination of the foregoing. In the context of this document, a computer readable storage medium may be any tangible medium able to contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take a variety of forms comprising, but not limited to, electro-magnetic, optical, or a suitable combination thereof. A computer readable signal medium may be a computer readable medium that is not a computer readable storage medium and that is able to communicate, propagate, or transport a program for use by or in connection with an instruction execution system, apparatus, or device. Program code embodied on a computer readable signal medium may be transmitted using an appropriate medium, comprising but not limited to wireless, wireline, optical fiber cable, RF, etc., or any suitable combination of the foregoing.

Computer program code for carrying out operations for aspects of the present disclosure may be written in a combination of one or more programming languages, comprising an object oriented programming language such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider) or in a cloud computing environment or offered as a service such as a Software as a Service ("SaaS").

Aspects of the present disclosure are described herein with reference to flowchart illustrations and/or block diagrams of methods, apparatuses (e.g., systems), and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that, when executed, may direct a computer, other programmable data processing apparatus, or other devices to function in a particular manner, such that the instructions, when stored in the computer readable medium, produce an article of manufacture comprising instructions which, when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses, or other devices to produce a computer implemented process, such that the instructions which execute on the computer or other programmable apparatus provide processes for implementing the functions/acts specified in the flowchart and/or block diagram block or blocks.

While certain example systems and methods disclosed herein may be described with reference to mainframes in cloud computing, systems and methods disclosed herein may be related to architecture and information technology ("IT") service and asset management in cloud computing, as well as usability and user experience in middleware and common services. Systems and methods disclosed herein may be applicable to a broad range of applications that monitor various parameters associated with various disciplines, such as, for example, IT systems and other activities of importance to the user.

Referring now to computing systems, existing systems may provide a user with a tutorial or help feature. This tutorial feature may be a module that allows the user to view electronic versions of documents. These electronic versions of documents may be in one or more electronic formats such as, for example, Portable Document Format ("PDF") or document file format ("DOC"). The user may use the documents to understand how to use an application or an object of an application. Existing systems may only be able to provide electronic versions of documents to the user. However, in some instances, the user may want to search for and access a recorded guide other than a document. The recorded guide may be, for example, a macro. Moreover, the user may also want to make or create their own recorded guides and/or share their recorded guides with other users.

System and methods disclosed herein may allow the user to search for a macro (e.g., via a search element of an integrated macro module), to record their own macro (e.g., via a record element of an integrated macro module), and to share their macro (e.g., via a publish element of an integrated macro module) with other users. Such systems and methods may provide an integrated macro module. The integrated macro module may be integrated into an application. Such systems and methods may present the user with an option to search for one or more macros. Each of these macros may have a name or header and one or more key phrases that describe the macro's properties. For example, a macro that addresses how to migrate datasets in an application may have a header, "How to Migrate a Dataset," and a set of key phrases comprising "Dataset," a description of a task (e.g., migration), a name of a tool that is used for migrating a dataset, and a reason for performing the task (e.g., to free up hard drive space). The header and the one or more key phrases may be used to search for the macros. Moreover, each of these macros may be associated with a name of an object in the application. For example, continuing from the last example, the macro may be associated with a name of an object in the application that is used for migrating a dataset or a name of an object in the application that is a part of a structure or tree for migrating a dataset. If the macro is associated with a name of an object, then such systems and methods may identify the macro as a macro that is related to the object. In such cases, the macro may be referred to as a "related macro." Such systems and methods may also provide an option to display the related macro to the user. For example, such systems and methods may display a button with the option to display the related macro next to the object on a screen, and the user may select the option by clicking on the button with a cursor. When the user selects the option to view the related macro, such systems and methods may further present the related macro to the user.

Moreover, such systems and methods may present the user with an option to an option to record a macro and an option to share the macro. When the user selects to record a macro, such systems and methods may start to record the macro. Recording the macro may comprise receiving data on performing a task in the application. The task may comprise one or more actions, wherein the one or more actions may be, for example, clicking an item, selecting an item, opening an item, and typing in an item. An item may be an element of the application, for example, a button, an icon, or a link. Elements in the application may, for example, be identified using internal application element identifiers. Alternatively, an additional layer for element identification may be provided.

In such systems and methods disclosed herein, there may be three types of macros. A macro may be a factory macro, wherein the factory macro is a macro that is provided by a service provider (e.g., a manufacturer, a distributor, a licensor). For example, a company that develops an application with a plurality of objects may provide macros for each of the plurality of objects in the application. The macros may help the user understand how to perform one or more actions with each of the plurality of objects. Alternatively, a macro may be a private macro, wherein the private macro is a macro that is recorded or made by a user and stored in a local repository. The local repository may be a memory located in a device that the user is using to execute or run the application. For example, continuing from the last example, a customer who purchases the application may record one or more additional macros for their private use. These one or more additional macros may be stored in a hard drive on a computer that the user is running the application on. The user may be an experienced engineer who is recording the one or more additional macros to instruct a beginning user on how to perform a task in the application. Additionally, a macro may be a public or shared macro, wherein the public macro is a macro that is recorded or made by a user and stored in a public repository. The public repository may be a memory that is accessible by a group of users that are running the application on different devices. The user that records the macro may want to make the macro a shared macro so that the macro can share information and knowledge with many users.

When a user chooses to search for a macro, such systems and methods may search among the macros that are stored in one or more repositories that are accessible to that user. These one or more repositories may be referred to as "accessible repositories." The accessible repositories may include one or more local repositories (e.g., a disc storage that stores factory macros, a computer hard drive that stores private macros) and one or more public repositories (e.g., a company server, a cloud storage). The search may comprise finding or identifying one or more macros that are each associated with one or more search terms. The one or more search terms may comprise a header, key phrases, or names of objects. Such systems and methods may then present the one or more macros to the user. Presenting the one or more macros may comprise displaying the headers for each of the one or more macros in a list. Upon viewing the list, the user may select a particular macro from the list. Such systems and methods may then present the user with a plurality of modes in which to play the particular macro. The plurality of modes may comprise an automatic implementation mode, an interactive implementation mode, a non-interactive demonstration mode, and an interactive demonstration mode. If the user selects the automatic implementation mode, then such systems and methods may execute the particular macro. The particular macro, when executed by a computer, may cause the computer to implement one or more actions. If the user selects the interactive implementation mode, then such systems and methods may, for each of the one or more actions, display a visual depiction of initiating the action, receive one or more inputs from the user, and implement the action in response to receiving the one or more inputs. In other words, such systems and methods may not execute the macro; instead, such systems and methods may show the user how to initiate each of the one or more actions and allow the user to initiate each action. Initiating an action may comprise performing an outside activity (e.g., typing a word into a textbox, clicking on a button using a mouse), which communicates one or more inputs to a computer and causes the computer to implement the action. In particular, such systems and methods may select a first action from the one or more actions and display a visual depiction of initiating the first action. To reduce confusion that the visual depiction of initiating the first action is actually implementing the first action, the visual depiction may be shown in colors that are different than the colors that are typically associated with the application. For example, the visual depiction may be shown in grayer or darker colors. Alternatively, the visual depiction may be shown in a separate window within the integrated macro module. Such systems and methods may then wait for the user to initiate the first action by mimicking the visually depicted performance. After the user mimics the visually depicted performance, such systems and methods may receive one or more inputs from the user and implement the first action in response to receiving the one or more inputs. The one or more inputs may comprise inputs that correspond to the outside activity performed by the user. The one or more inputs from the user may also comprise an input to continue playing the particular macro. For example, after the user implements the action, the user may click on a button marked "Next Step." After implementing the first action, such systems and methods may then repeat this process for each of the other actions in the one or more actions.

If the user selects the non-interactive demonstration mode, then such systems and methods may display a visual depiction of implementing the one or more actions. In other words, such systems and methods may demonstrate on a screen how each of the one or more actions are implemented. Similar to the above visual depiction, the visual depiction of implementing the one or more actions may be shown in colors that are different than the colors that are typically associated with the application. Showing the visual depiction in different colors may reduce confusion that the visual depiction is actually implementing the one or more actions. To clearly demonstrate the one or more actions, one or more elements on the screen may also be shown in a different color. For example, a moving cursor or a button may be shown in red during implementation of an action. Finally, if the user selects the interactive demonstration mode, then such systems and methods may perform a process that is similar to the process performed above for the interactive implementation mode, except that none of the actions may be implemented. Specifically, when the user selects the interactive demonstration mode, such systems and methods may display a visual depiction of initiating each action, display a simulation of the application, wait for the user to initiate the action on the simulation of the application, receiving one or more inputs from the user, and implement the action in the simulation of the application. Thus, instead of implementing the one or more actions in the application, such systems and methods may implement the one or more actions in a simulation of the application such that none of the one or more actions are actually implemented.

Systems and methods disclosed herein may provide an interactive way for users to share and obtain information about an application's features. Unlike existing systems and methods that only provide access to written content, such systems and methods may provide users with recorded content. The recorded content may comprise data on performing a task in the application. By accessing the recorded content, users may learn how to perform the task. Additionally, users can create their own recorded content. For example, experienced engineers can create a macro for a beginner engineer in a field. Moreover, after such recorded content is created and stored, it can be used by future generations of users. Service providers that notice that particular recorded content is useful may also include such content as a factory macro in a next release of the application.

Furthermore, in some systems and methods, a small change associated with an application may not reduce the usefulness of existing recorded content. Such systems and methods may also provide an efficient way for new recorded content to replace existing recorded content if the application undergoes a significant change. For applications that have a consolidated user interface (i.e., a user interface that is used in a plurality of applications), such systems and methods may also enable the user to quickly learn about using many applications or particular features in many applications.

Referring now to FIG. 1, a network 1 for a user to access and use an integrated macro module. Network 1 may comprise one or more clouds 2, which may be public clouds, private clouds, or community clouds. Each cloud 2 may permit the exchange of information and services among users that are connected to such clouds 2. In certain configurations, cloud 2 may be a wide area network, such as the Internet. In some configurations, cloud 2 may be a local area network, such as an intranet. Further, cloud 2 may be a closed, private network in certain configurations, and cloud 2 may be an open network in other configurations. Cloud 2 may facilitate wired or wireless communications of information among users that are connected to cloud 2.

Network 1 may comprise one or more servers 3 and other devices operated by service providers and users. Network 1 also may comprise one or more devices 4 utilized by users. Service providers and users may provide information to each other utilizing the one or more servers 3, which connect to the one or more devices 4 via cloud 2. Servers 3 may comprise, for example, one or more of general purpose computing devices, specialized computing devices, mainframe devices, wired devices, wireless devices, monitoring devices, infrastructure devices, and other devices configured to provide information to service providers and users. Devices 4 may comprise, for example, one or more of general purpose computing devices, specialized computing devices, mobile devices, wired devices, wireless devices, passive devices, routers, switches, mainframe devices, monitoring devices, infrastructure devices, and other devices utilized by service providers and users. Exemplary items may include network 1, cloud 2, servers 3, and devices 4.

Moreover, network 1 may comprise one or more systems 100 that may provide an integrated macro module. System 100 may be, for example, one or more of a general purpose computing device, a specialized computing device, a wired device, a wireless device, a mainframe device, an infrastructure device, a monitoring device, and any other device configured to provide an integrated macro module. System 100 may also be configured to collect data from one or more data sources (e.g., servers, sensors, networks, interfaces, other devices). System 100 may collect information from network 1, cloud 2, servers 3, devices 4, and other devices connected to cloud 2. System 100 may connect to cloud 2 and monitor network 1, cloud 2, servers 3, devices 4, and other devices connected to cloud 2 for available information. The available information may be user information, access information, performance information, infrastructure information, software or application information, usability information, and other information provided by service providers and users. By collecting the available information from network 1, cloud 2, servers 3, devices 4, and other devices connected to cloud 2, system 100 may perform one or more processes associated with using the integrated macro module. These one or more processes may comprise searching for a macro.

In some configurations, one or more of servers 3 and devices 4 may comprise system 100. In other configurations, system 100 may be separate from servers 3 and devices 4.

Figure 2:
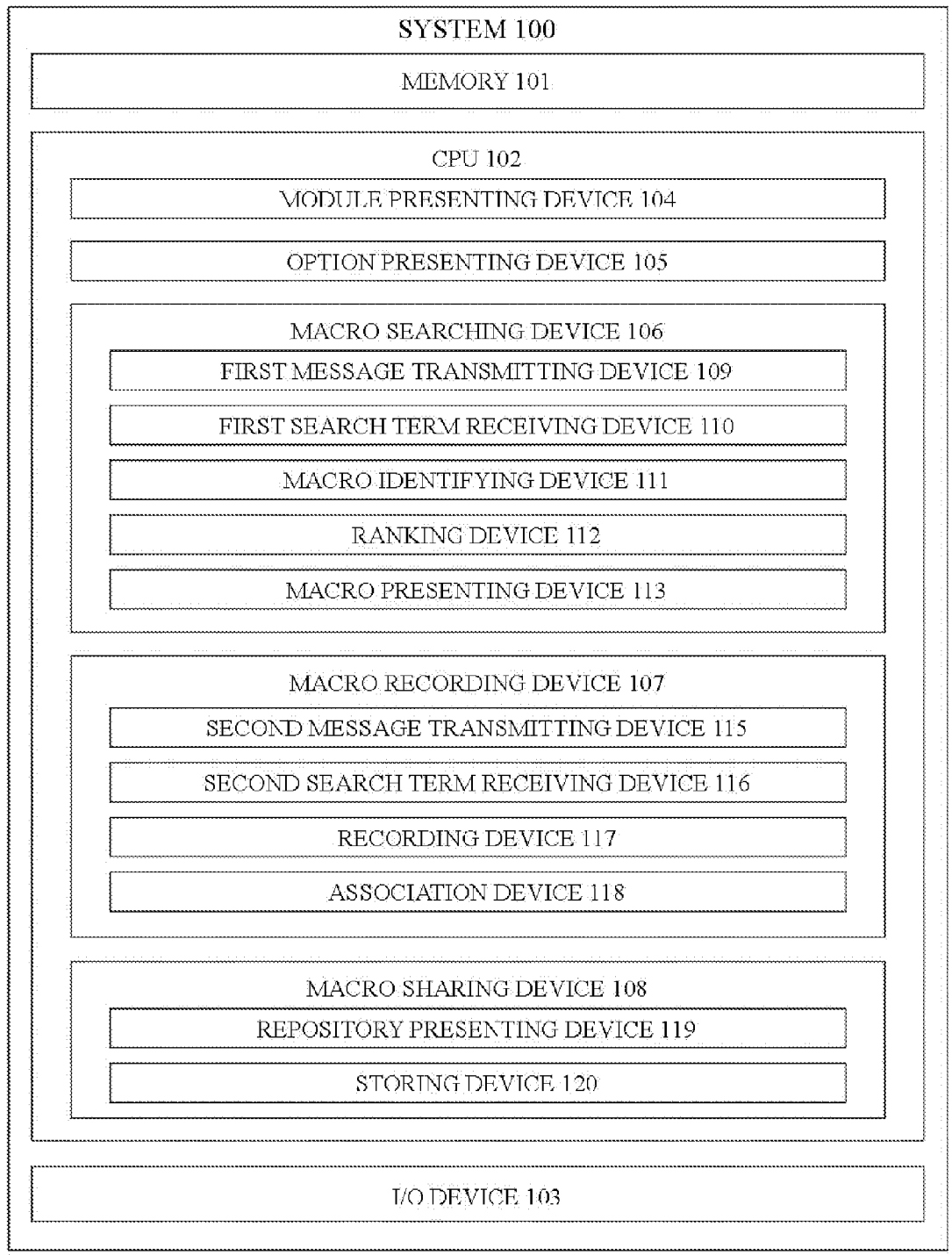
FIG. 2 is a schematic representation of a first system configured to present, within an application, an integrated macro module.
Figure 3:
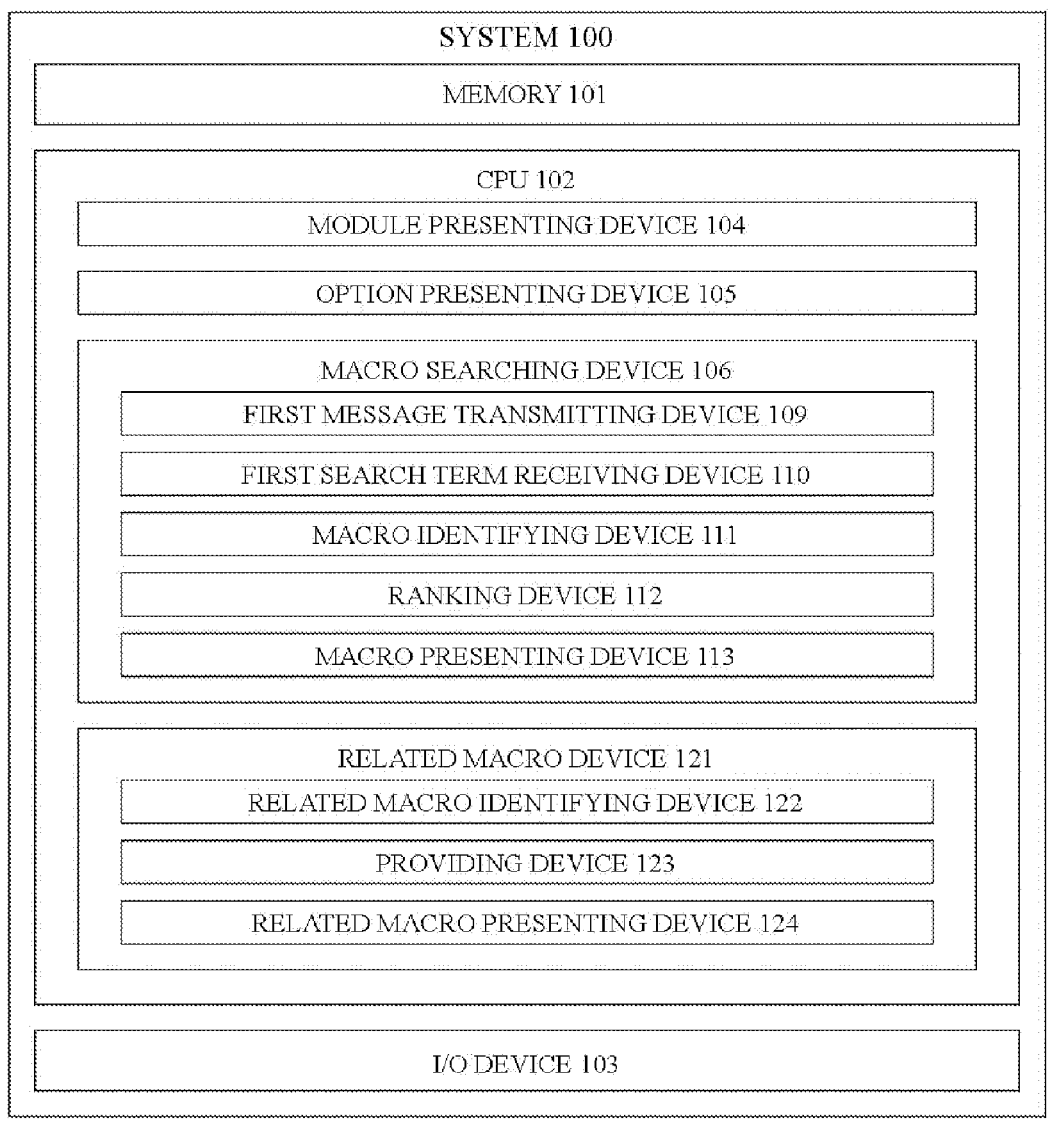
FIG. 3 is a schematic representation of a second system configured to present, within an application, an integrated macro module.

Referring now to FIGS. 2 and 3, system 100, which may provide an integrated macro module, is now described. System 100 may reside on one or more networks 1. System 100 may comprise a memory 101, a central processing unit ("CPU") 102, and an input and output ("I/O") device 103. Memory 101 may store computer-readable instructions that may instruct system 100 to perform certain processes. In particular, when executed by CPU 102, the computer-readable instructions stored in memory 101 may instruct CPU 102 to operate as one or more devices. In FIG. 2, CPU 102 may operate as one or more of a module presenting device 104, an option presenting device 105, a macro searching device 106, a macro recording device 107, and a macro sharing device 108. Searching device 106 may comprise a first message transmitting device 109, a first search term receiving device 110, a macro identifying device 111, a ranking device 112, and a macro presenting device 113. Recording device 107 may comprise a second message transmitting device 115, a second search term receiving device 116, a recording device 117, and an association device 118. Macro sharing device 108 may comprise a repository presenting device 119 and a storing device 120.

In FIG. 3, system 100 may operate as one or more of a module presenting device 104, an option presenting device 105, a macro searching device 106, and a related macro device 121. Related macro device 121 may comprise a related macro identifying device 122, a providing device 123, and a related macro presenting device 124.

In certain configurations, CPU 102 may only operate as module presenting device 104, option presenting device 105, and macro searching device 106. In other configurations, CPU 102 may only operate as module presenting device 104, option presenting device 105, and macro recording device 107. In still other configurations, CPU 102 may only operate as module presenting device 104, option presenting device 105, macro recording device 107, and macro sharing device 108. In particular configurations, CPU 102 may only operate as module presenting device 104, option presenting device 105, macro searching device 106, and macro recording device 107. In other configurations, CPU 102 may operate as any of the above combinations in addition to related macro device 121. In certain configurations, searching device 106 may not comprise ranking device 112. In other configurations, sharing device 108 may not comprise repository presenting device 119. In still other configurations, one or more of module presenting device 104, option presenting device 105, macro searching device 106, macro recording device 107, and macro sharing device 108 may be implemented on one or more different CPUs, which may be comprised in devices 4 or other devices.

I/O device 103 may receive one or more of data from networks 1, data from other devices and sensors connected to system 100, and input from a user and provide such information to CPU 102. I/O device 103 may transmit data to networks 1, may transmit data to other devices connected to system 100, and may transmit information to a user (e.g., display the information, send an e-mail, make a sound). Further, I/O device 103 may implement one or more of wireless and wired communication between system 100 and other devices.

Figure 4:
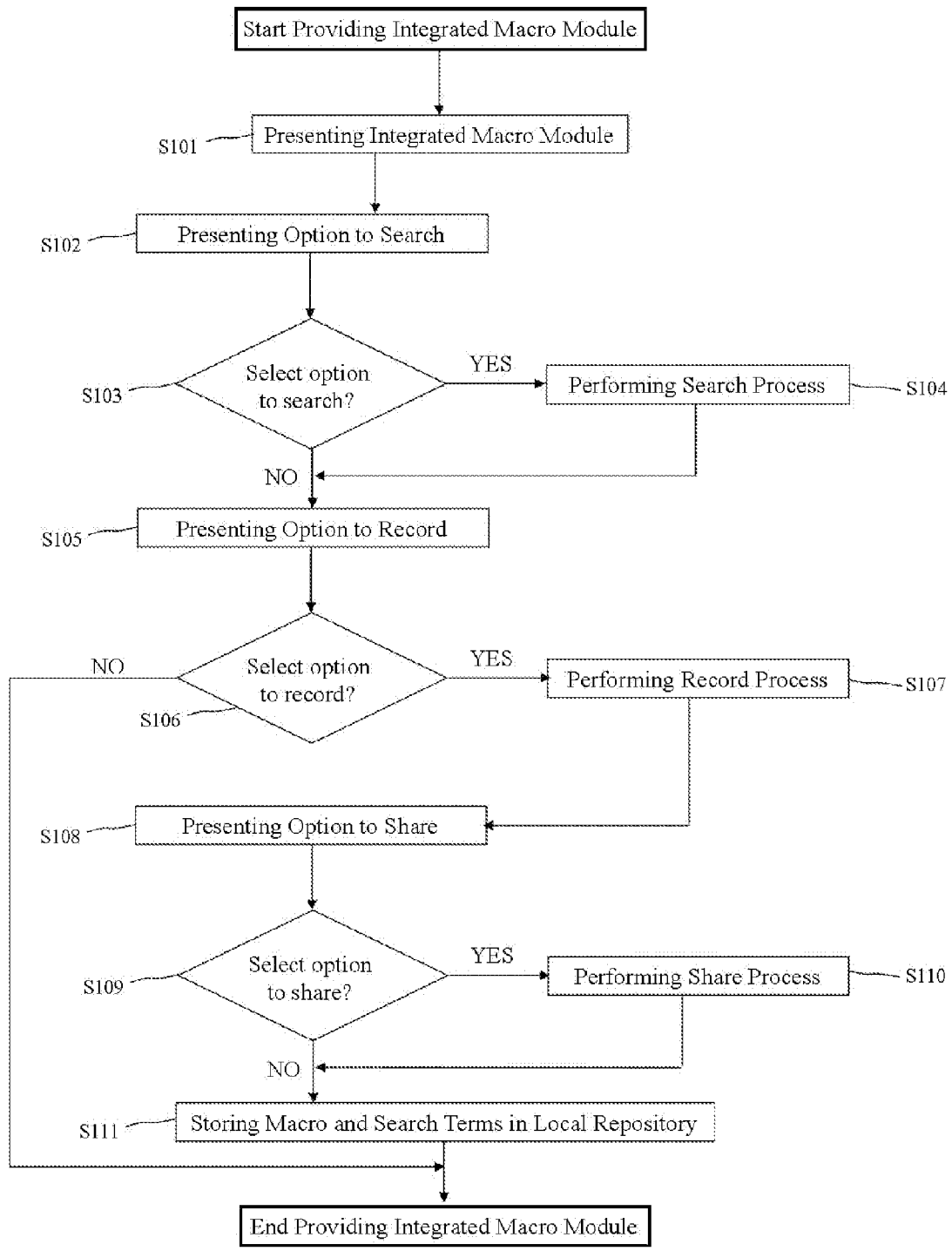
FIG. 4 illustrates a first process of presenting, within an application, an integrated macro module.
Figure 5:
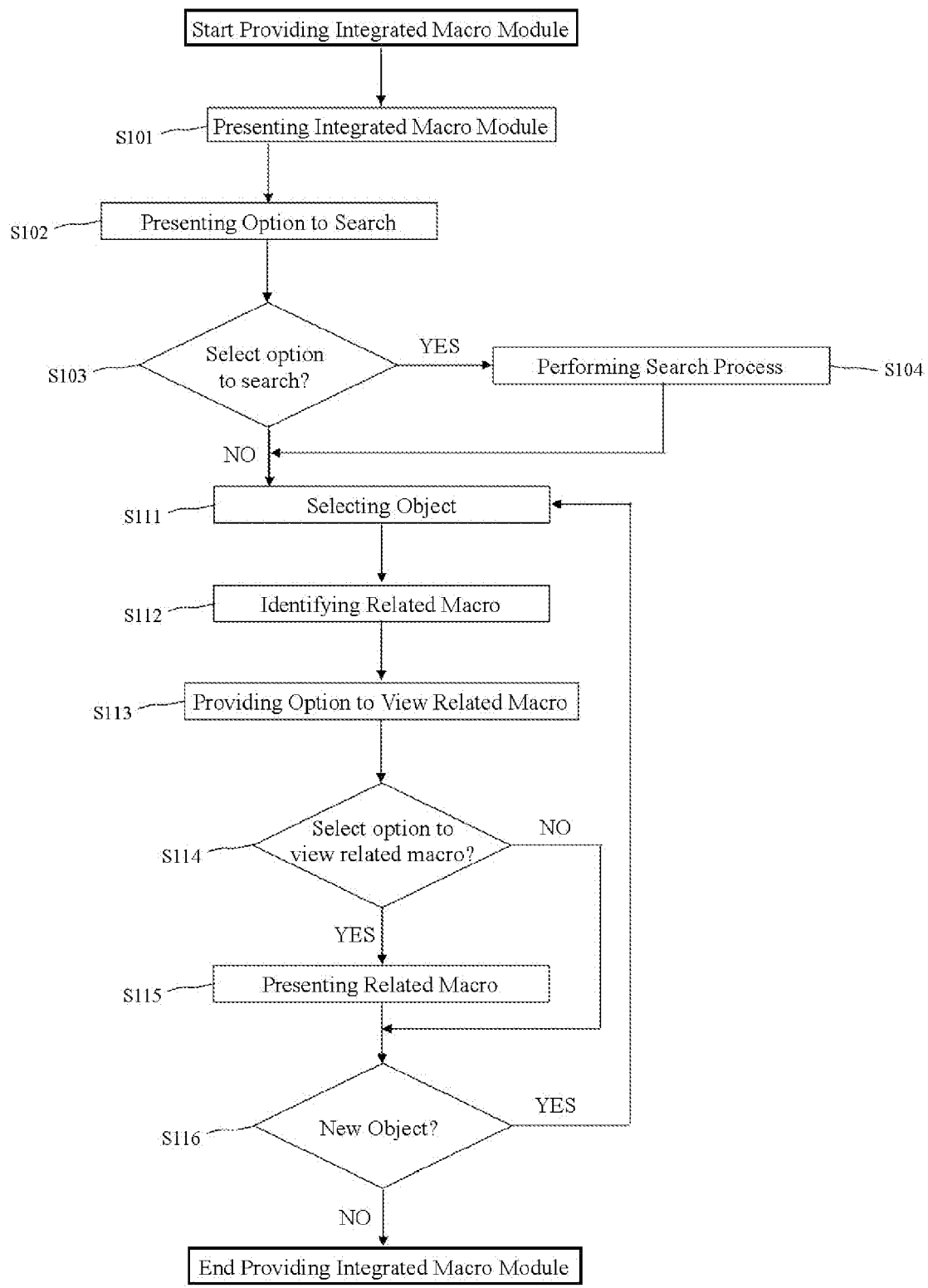
FIG. 5 illustrates a second process of presenting, within an application, an integrated macro module.
Figure 6:
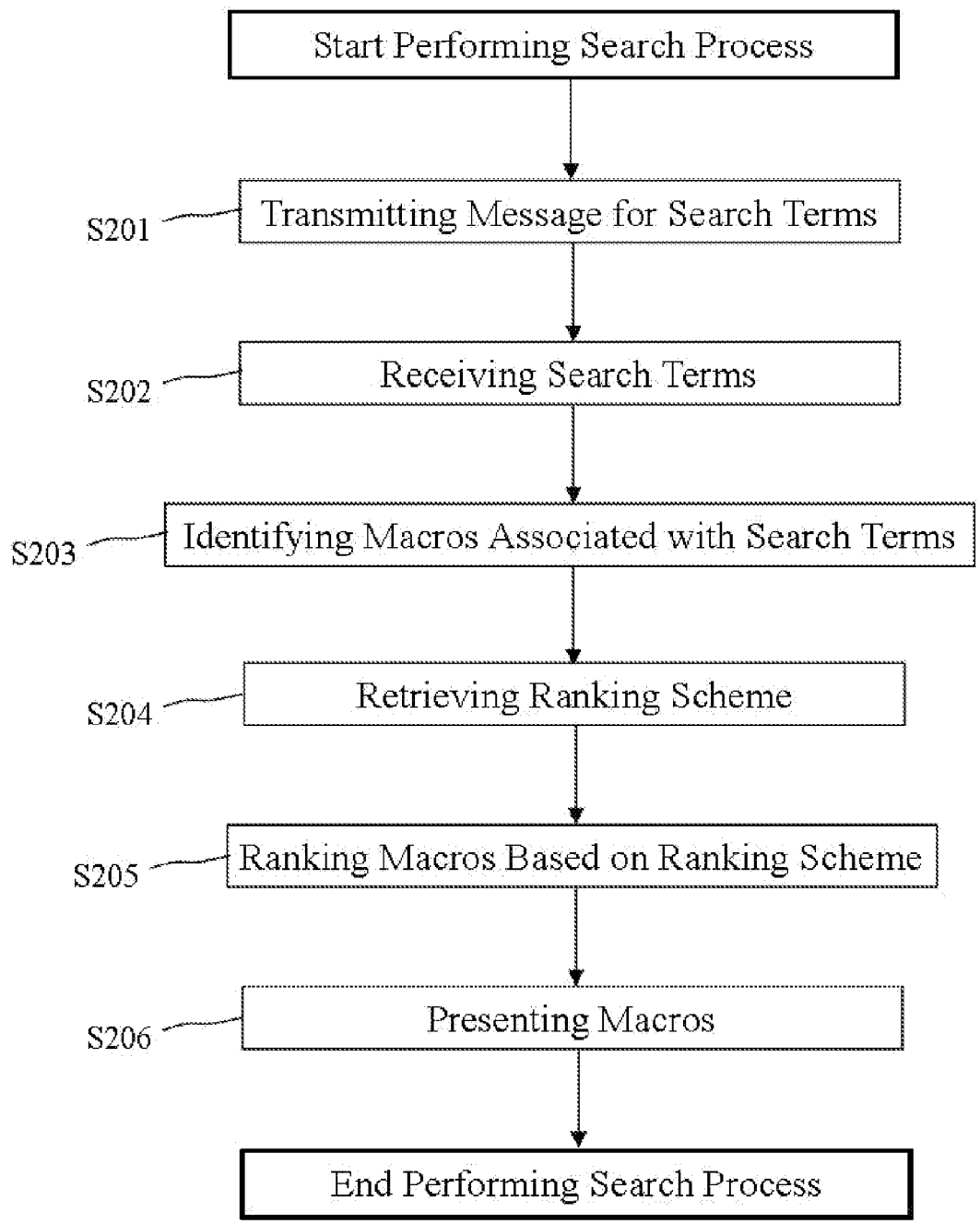
FIG. 6 illustrates a process of searching for macros.

Referring now to FIG. 4-8, processes performed by module presenting device 104, option presenting device 105, macro searching device 106, macro recording device 107, macro sharing device 108, and related macro device 121 now are described. FIG. 4 depicts a process of presenting, within an application, an integrated macro module and presenting options to search for macros (e.g., via a search element of an integrated macro module), to record a macro (e.g., via a record element of an integrated macro module), and to share a macro (e.g., via a publish element of an integrated macro module). A macro may be an instruction that, when executed by a computer, may cause the computer to perform one or more actions. In S101, module presenting device 104 may present, within an application, an integrated macro module. The integrated macro module may be integrated into an application. The application may be computer software that allows a user to perform one or more actions. The user may be running the application on a device. The application may comprise one or more objects. The one or more objects may be important elements of the application. In S102, option presenting device 105 may present an option to search for a first macro. Presenting the option to search for a first macro may comprise, for example, displaying a notification that asks the user whether he would like to search for a first macro. When the option to search for a first macro is selected (S103: YES), then the process may proceed to S104, and macro searching device 106, operating as first message transmitting device 109, first search term receiving device 110, macro identifying device 111, ranking device 112, and macro presenting device 113, may search for a first macro. Macro searching device 106 may be a search element of the integrated macro module. Selecting the option to search for the first macro may generate a request to search for a macro; thus, when the option to search is selected, macro searching device 106 may receive a request to search for a video. In S104, macro searching device 106 may transmit a message. The message may ask the user for one or more search terms that correspond to the first macro. Macro searching device 106 may receive the one or more search terms from the user and use the one or more search terms to identify one or more macros. The identified macros may be macros that are each associated with at least one of the one or more search terms. Macro searching device 106 may then present the identified macros to the user. FIG. 6, described below, provides a more detailed view of S104.

Figure 7:
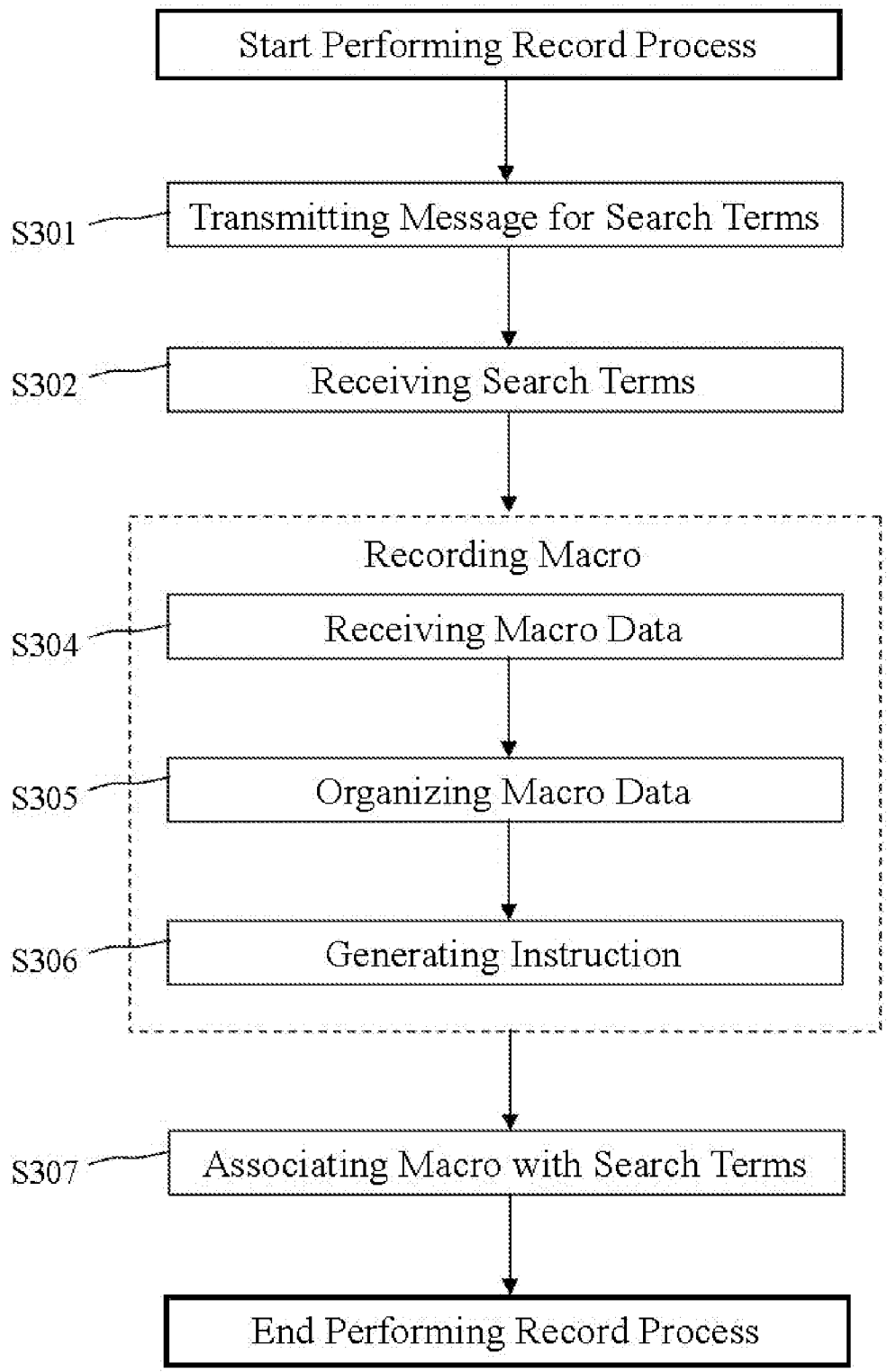
FIG. 7 illustrates a process of recording a macro.

When the option to search for a first macro is not selected (S103: NO), then the process may proceed to S105. In S105, option presenting device 105 may present an option to record a second macro. Similar to presenting the option to search for a first macro, presenting the option to record a second macro may comprise, for example, displaying a notification that asks the user whether he would like to record a second macro. When the option to record a second macro is selected (S106: YES), then the process may proceed to S107, and macro recording device 107, operating as second message transmitting device 115, second search term receiving device 116, recording device 117, and association device 118, may record a second macro. Macro recording device 107 may be a record element of the integrated macro module. Selecting the option to record the second macro may generate a request to record the second macro; thus, when the option to record is selected, macro recording device 107 may receive a request to record the second macro. When the option to record a second macro is not selected (S106: NO), then the process may terminate. In S107, macro recording device 107 may transmit a message. The message may ask the user for one or more search terms that correspond to the second macro. These one or more search terms may be referred to as "one or more further search terms." Macro recording device 107 may receive the one or more further search terms from the user. Macro recording device 107 may then record the second macro and associate the second macro with the one or more further search terms. FIG. 7, described below, provides a more detailed view of S107.

Figure 8:
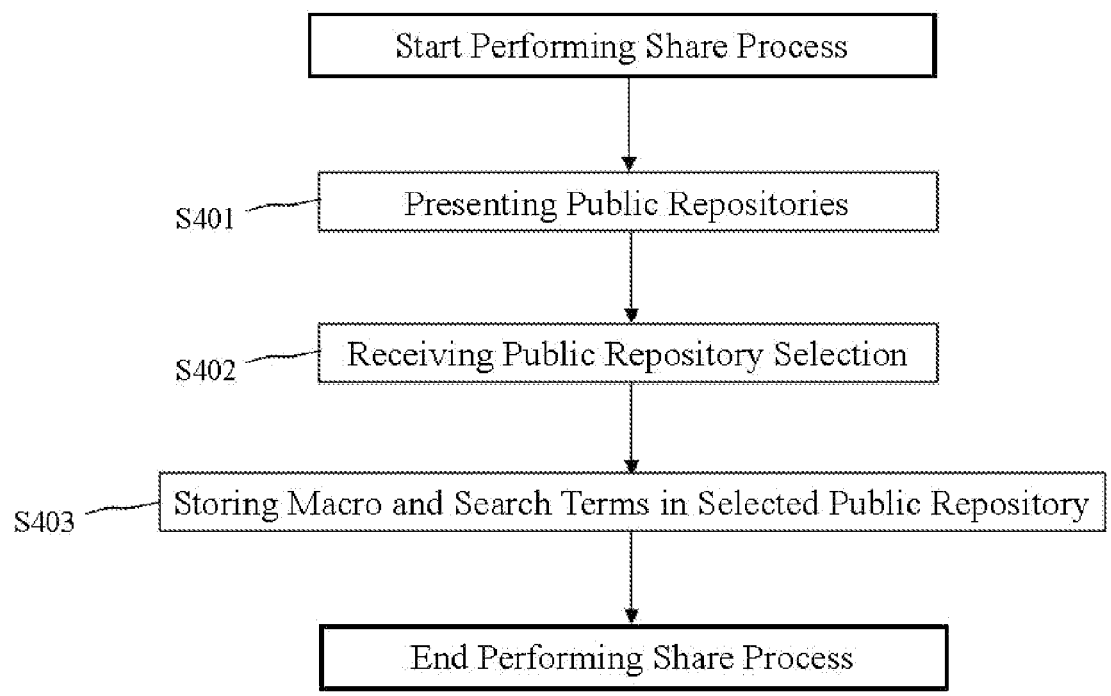
FIG. 8 illustrates a process of sharing a macro.

In S108, option presenting device 105 may present an option to share the second macro. Similar to presenting the options above, presenting the option to share the second macro may comprise, for example, displaying a notification that asks the user whether he would like to share the second macro. When the option to share the second macro is selected (S109: YES), then the process may proceed to S110, and macro sharing device 108, operating as repository presenting device 119 and storing device 120, may share the second macro. Macro sharing device 108 may be a publish element of the integrated macro module. Selecting the option to share the second macro may generate a request to share the second macro; thus, when the option to share is selected, macro sharing device 108 may receive a request to share the second macro. In S110, macro sharing device 108 may present one or more public repositories to the user. As described above, the one or more public repositories may comprise a physical or a logical memory that is accessible by a group of users that are running the application on different devices. The one or more public repositories may be located on the device that is running the application. Alternatively, the one or more public repositories may be located on a remote device. Examples of a public repository include a remote server and online storage. The user may select one of the one or more public repositories to store the second macro in. After the user makes a selection, macro sharing device 108 may store the second macro and the search terms in the selected public repository. FIG. 8, described below, provides a more detailed view of S110.

When the option to share the second macro is not selected (S109: NO), then the process may proceed to S111. In S111, sharing device 108 may store the second macro and the one or more search terms in a local repository. The local repository may be a physical or a logical memory that is only accessible by the user. The local repository may be directly connected to the device that the user is using to run the application. Examples of a local repository include a hard drive on the device that is running the application and a memory card connected to such device. After the second macro and the one or more search terms are stored, then the process may terminate.

In certain configurations, S102/S103 and S105/S106 may be performed concurrently. Option presenting device 105 may present an option to search for a first macro and an option to record a second macro at the same time, and the user may select either option. If the user selects the option to search for a first macro (S103: YES), then the process may proceed to S104. Alternatively, if the user selects the option to record a second macro (S106: YES), then the process may proceed to S107. In other configurations, S105 through S11 may be performed before S102 through S104. In particular configurations, S108 through S110 may be omitted and the process may proceed from S107 to S111. In other configurations, S108 through S110 may be performed again after S111. Option presenting device 105 may present an option to share the second macro to the user again. In such configurations, the second macro may already be stored in a local repository or one or more public repositories. The user may select the option to share the second macro again because the user would like to store the second macro in a different local or public repository. In other configurations, S105 through S111 may be omitted, and the process may terminate after S104. In still other configurations, S102 through S104 may be omitted, and the process may proceed from S101 to S105. In such configurations, S108 through S110 may be omitted and the process may proceed from S107 to S11.

Referring now to FIG. 5, a process of presenting, within an application, an integrated macro module, presenting an option to search for macros, identifying a related macro for each object of the application, and providing an option to view the related macro for each object, now is described. As described above, in S101-S104, module presenting device 104 may present, within the application, an integrated macro module, option presenting device 105 may present an option to search for a first macro, and macro searching device 106 may search for a first macro when the option to search for a first macro is selected. In S112-S117, related macro device 121, operating as related macro identifying device 122, providing device 123, and related macro presenting device 124, may identify a related macro for each object in the application, provide an option to access the related macro for each object, and present the related macro for a particular object to the user when he selects the option to view the related macro for that object. As described above, an object may be an important element of the application (e.g., a window, a menu, a toolbar, a control). In S112, related macro identifying device 122 may select a first object. In S113, related macro identifying device 122 may identify a related macro for the first object. The related macro may be stored in an accessible repository. The accessible repository may be a memory that the user can currently access on the device that is running the application. The accessible repository may comprise a local repository or a public repository. The related macro may be a macro that is associated with a search term, wherein the search term is the object's name or a similar name that corresponds to the object.

Figure 9:
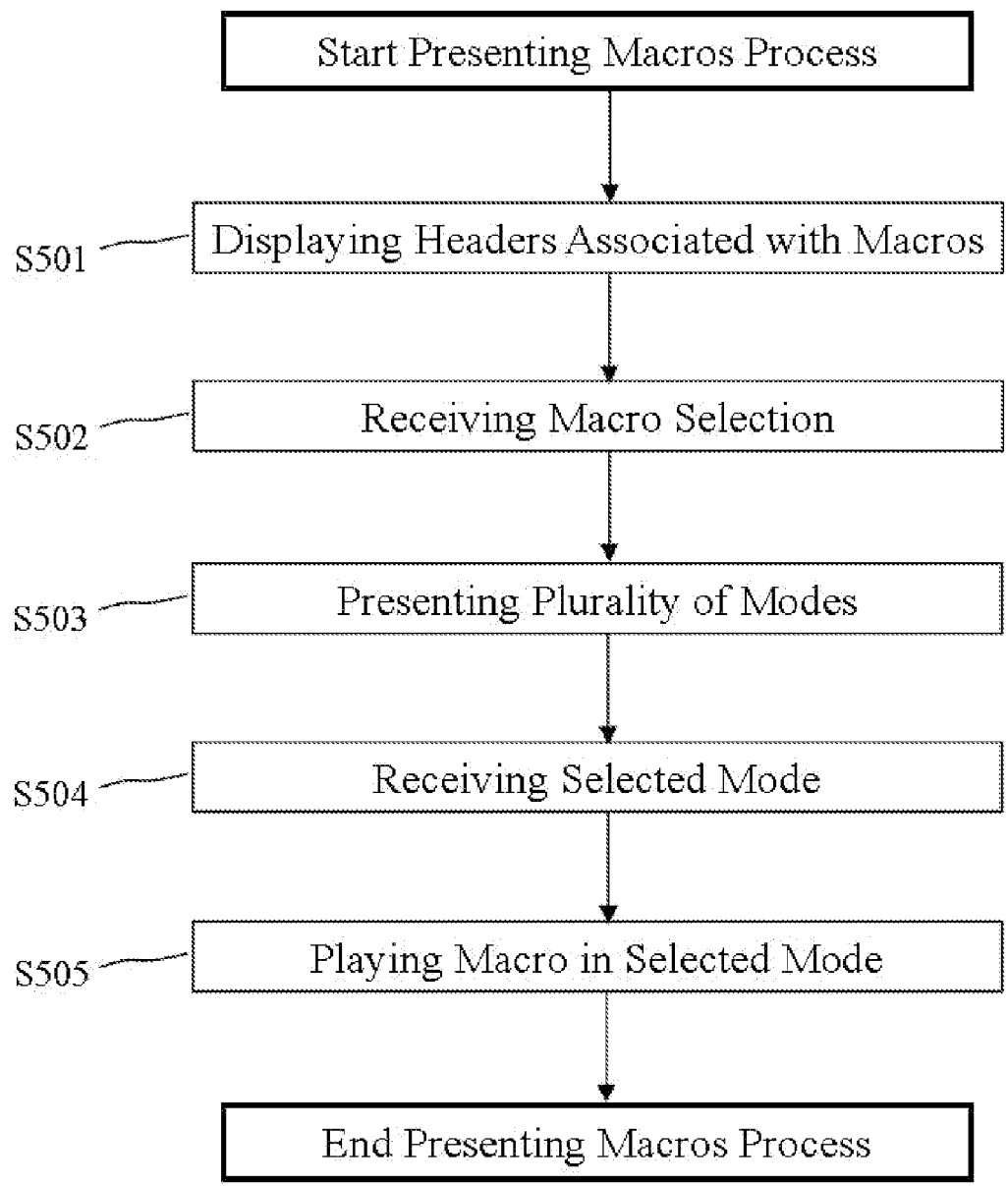
FIG. 9 illustrates a process of presenting one or more macros.
Figure 10:
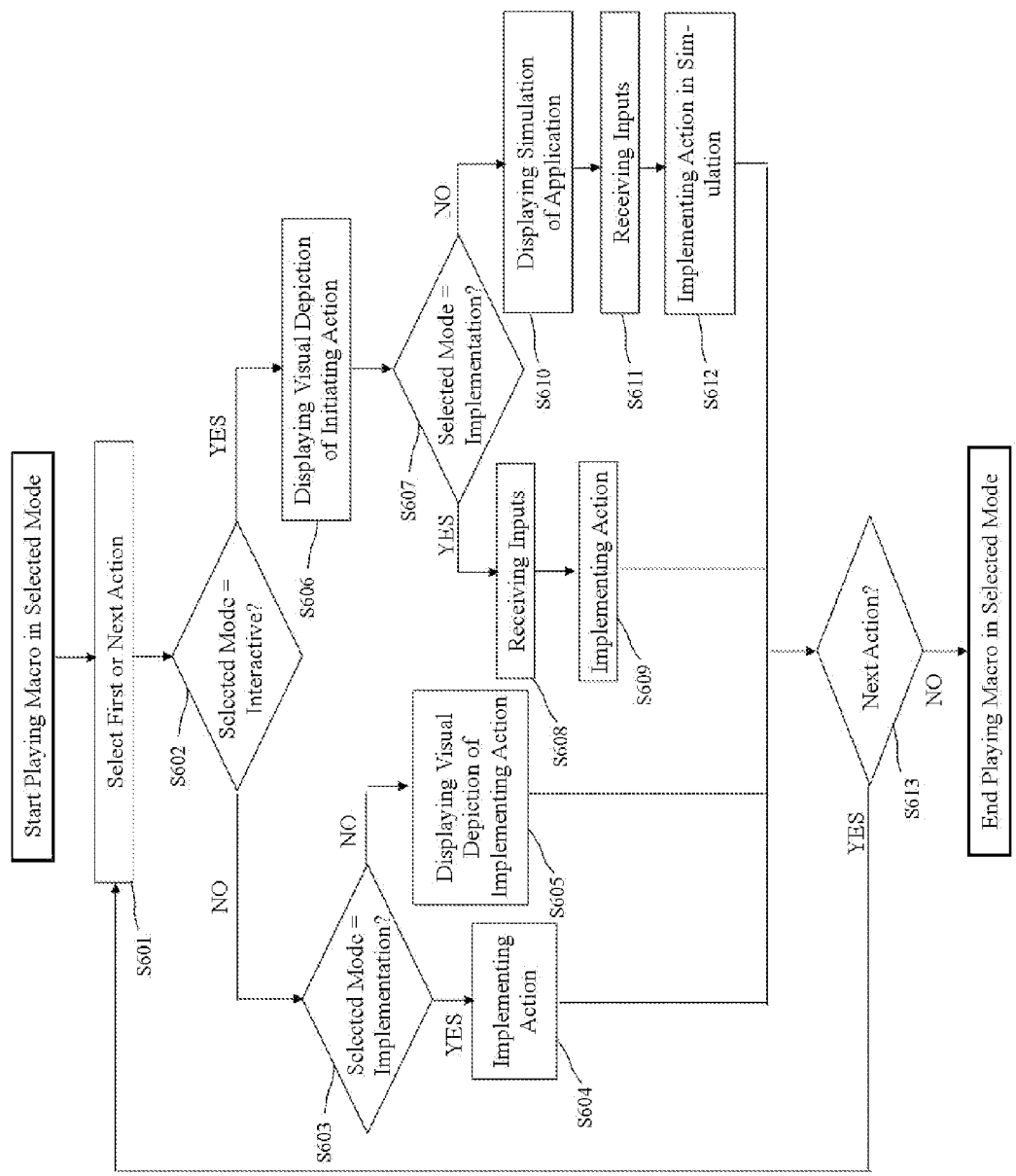
FIG. 10 illustrates a process of executing a macro in a selected mode.

In S114, providing device 123 may provide an option to access the related macro. Providing the option to access the related macro may comprise displaying a button or an icon. For example, if the object is a window, providing device 123 may display a button with the text "View Macro Associated with Window" or display a question mark icon on the window's title bar. The user may then select the option to access the related macro by clicking on the button or the icon. If the user selects the option to access the related macro (S115: YES), then the process may proceed to S116, and related macro presenting device 123 may present the related macro. Selecting the option to view the related macro may generate a request to view the related macro; thus, if the user selects the option to view, then related macro presenting device 123 may receive a request to view the related macro. If the user does not select the option to view the related macro (S115: NO), then the process may proceed to S117. Presenting the related macro may comprise displaying a name or header associated with the related macro. Alternatively, presenting the related macro may comprise playing the related macro in a selected mode on a display. The display may be a display connected to the device that is running the application. FIGS. 9-10, described below, provide more detailed views of presenting a macro. In S117, related macro identifying device 122 may then determine whether the application has additional objects. Determining whether the application has additional objects may comprise referencing a predefined list of objects. The predefined list may comprise objects that are specific to the application, general objects (i.e., objects that may exist in many applications), or both. Objects may be added to the predefined list by the user, another user, or another party (e.g., a service provider).

If related macro identifying device 122 determines that there are additional objects (S117: YES), then the process may proceed back to S112. The process may then repeat S112 through S117 until related macro identifying device 122 determines that the application has no additional objects. If related macro identifying device 122 determines that there are no additional objects (S117: NO), then the process may terminate.

In certain configurations, the process depicted in FIG. 5 may also include S105 through S111. In such configurations, S105 through S111 may be performed before S102, after S104 and before S112, or after S117. Moreover, in such configurations, S112 through S117 may be performed before, during, or after any of the other steps (i.e., S101-S111).

Referring now to FIG. 6, which provides a detailed view of S104, macro searching device 106, operating as first message transmitting device 109, first search term receiving device 110, macro identifying device 111, ranking device 112, and macro presenting device 113, may search for a first macro. In S201, first message transmitting device 109 may transmit a message to the user. The message may ask for one or more search terms corresponding to the first macro. In S202, first search term receiving device 110 may receive the one or more search terms from the user. The one or more search terms may comprise one or more headers, key phrases, and names of objects. A header may be a name or title that is associated with the first macro. A key phrase may be a word or a phrase that describes useful information related to the first macro (e.g., a name of a tool that is used in the first macro, a description of a task that is performed and a reason for performing the task). The name of an object may correspond to an object in the application that is related to the first macro. For example, if an user wants to search for a first macro that includes information on how to migrate datasets in the application, the user may provide first search term receiving device 110 with a header "How to Migrate a Dataset," a key word such as "Dataset" or "Migration," and a name of an object that is used for migrating a dataset.

In S203, macro identifying device 111 may identify a plurality of macros. The plurality of macros may be a plurality of distinct macros, wherein each of the plurality of distinct macros is different from one another. Each of the plurality of macros may be stored in an accessible repository and may be associated with at least one of the one or more search terms. As described above, the accessible repository may be a memory that the user can currently access on the device that is running the application. The accessible repository may comprise a local repository or a public repository. The local repository may be a physical or a logical memory that is only accessible by the user, and the public repository may comprise a physical or a logical memory that is accessible by a group of users that are running the application on different devices. In S205 and S206, ranking device 112 may then retrieve a predetermined scheme and rank the plurality of macros based on the predetermined scheme. The predetermined scheme may be referred to as a "ranking scheme." The ranking scheme may comprise, for example, an expected relevance ranking, an alphabetical ordering, and a ranking tied to user information (e.g., highest user ratings, highest user views, last viewed or accessed date). After the plurality of macros is ranked, macro presenting device 113 may then present the plurality of macros to the user in S206. Presenting the plurality of macros may comprise, for example, displaying a list of the ranked macros on a display such as a mobile phone, a tablet computer, a laptop computer, a desktop computer, an audio receiving system, a television, or another type of terminal device configured to display data. Displaying a list of the ranked macros may comprise displaying, for each of the ranked macros, a header that is associated with that macro in the list. Alternatively, presenting the plurality of macros may comprise playing each of the ranked macros or a subset of the ranked macros (e.g., macros with the highest few rankings) in a selected mode, one after another in the order that they are ranked, to the user.

In certain configurations, macro identifying device 111 may only identify a particular macro. In such configurations, S204 and S205 may be omitted, and macro presenting device 113 may present the particular macro in S206. Similar to the process depicted in FIG. 6, presenting the particular macro may comprise at least one of displaying a header associated with the particular macro and playing the particular macro in a selected mode. FIGS. 9-10, described below, provide more detailed views of S206.

Referring now to FIG. 7, which provides a detailed view of S107, macro recording device 107, operating as second message transmitting device 115, second search term receiving device 116, recording device 117, and association device 118, may record a second macro. In S301, second message transmitting device 115 may transmit a message to the user. The message may ask for one or more search terms corresponding to the second macro. In S302, second search term receiving device 116 may receive the one or more search terms from the user. The one or more search terms may comprise one or more headers, key phrases, and names of objects. As described above, a header may be a name or title that describes the second macro; a key phrase may be a word or a phrase that describes useful or important information related to the second macro; and a name of an object may correspond to an object in the application that is related to the second macro.

In S304 and S305, recording device 117 may record the second macro. Specifically, in S303, recording device 117 may receive data on performing a task in the application. This data may be referred to as "macro data." The task may comprise one or more actions. In S304, recording device 117 may organize the one or more actions based on an order that the macro data is received. For example, if macro data corresponding to a first action is received first and macro data corresponding to a second action is received second, then the two actions may be organized as the first action followed by the second action. As another example, if macro data corresponding to a first action and macro data corresponding to a second action are received at the same time, then the two actions may be organized together. Then, in S305, recording device 117 may generate an instruction that, when executed by a computer, may cause the computer to implement the one or more actions as organized. In S306, association device 118 may then associate the second macro with the one or more search terms. For example, association device 118 may add metadata to the second macro, wherein the metadata comprises the one or more search terms.

Referring now to FIG. 8, which provides a detailed view of S110, macro sharing device 107, operating as repository presenting device 119 and storing device 120, may share the second macro. In S401, repository presenting device 119 may present one or more public repositories to store the second macro in. As described above, the one or more public repositories may comprise a physical or a logical memory that is accessible by a group of users that are running the application on different devices. The one or more public repositories may be located on the device that is running the application. Alternatively, the one or more public repositories may be located on a remote device. In S402, the user may select one of the one or more public repositories to store the second macro in. Storing device 120 may receive the user's public repository selection. In S403, storing device 120 may then store the second macro and the one or more search terms in the selected public repository.

Referring now to FIGS. 9-10, a process of presenting one or more macros within the application now is described. A user may be running the application on a device. In S501, macro presenting device 113 may display, for each of the one or more macros, a header that is associated with the macro. The headers may be displayed in a list. If the one or more macros have been ranked according to a predetermined scheme, then the one or more macros may be listed based on their rankings. Upon viewing the list, the user may select a macro from the list. The selected macro may be referred to as the "macro selection." In S502, macro presenting device 113 may receive the macro selection from the user. Macro presenting device 113 may then present the user with a plurality of modes in which to play the particular macro. The plurality of modes may comprise modes that are interactive or not interactive and involve implementation or no implementation. A particular mode may be interactive if playing the selected macro in that mode would comprise performing a step in response to user activity, and a particular mode may involve implementation if playing the selected macro in that mode would comprise implementing one or more actions in the application. A mode that is non-interactive and involves implementation may be referred to as an "automatic implementation mode"; a mode that is interactive and involves implementation may be referred to as an "interactive implementation mode"; a mode that is not interactive and does not involve implementation may be referred to as a "non-interactive demonstrative mode"; and a mode that is interactive and does not involve implementation may be referred to as an "interactive demonstrative mode." Thus, the plurality of modes may comprise an automatic implementation mode, an interactive implementation mode, a non-interactive demonstration mode, and an interactive demonstration mode. The user may select a mode from the plurality of modes. In S504, macro presenting device 113 may receive the selected mode. In S505, macro presenting device 113 may then play the selected macro in the selected mode.

In certain configurations, the process of presenting one or more macros may only comprise S501 (i.e., S502 through S505 may be omitted). In other configurations, S501 and S502 may be omitted. In such configurations, if macro presenting device 113 is only presenting a particular macro, then macro presenting device 113 may play the particular macro in a selected mode (i.e., perform S503 through S505 for the one macro). Alternatively, if macro presenting device 113 is presenting a plurality of macros, then macro presenting device 113 may play each of the plurality of macros or a subset of the plurality of macros in a selected mode (i.e., macro presenting device 113 may repeat S503 through S505 for each of the plurality of macros or a subset of the plurality of macros). If the plurality of macros is ranked, then macro presenting device 113 may play the plurality of macros in the order that they are ranked. In particular configurations, S501/S502 may be performed before, after, or concurrently with S503/S504.

FIG. 10 now provides a detailed view of S505. As described above, a macro may be an instruction that, when executed by a computer, may cause the computer to implement one or more actions. The one or more actions may be associated with performing a task. In S601, macro presenting device 113 may select a first action from one or more actions recorded in the selected macro. In S602, macro presenting device 113 may determine whether the selected mode is interactive. If the selected mode is interactive (S602: YES), then the process may proceed to S606. In S606, macro presenting device 113 may display a visual depiction of initiating the first action. As described above, initiating an action may comprise performing an outside activity which communicates one or more inputs to a computer and causes the computer to implement the action. The outside activity may comprise a mouse activity, a keyboard activity, a mouse and keyboard activity, a touchscreen input, and a motion sensor input. A mouse activity may be one or more of clicking an item (e.g., single clicking, double clicking), dragging an item, pointing to an item, and scrolling; a keyboard activity may be a pressing down on one or more keys, in sequence or concurrently; a mouse and keyboard activity may involve a combination of one or more mouse activities and keyboard activities (e.g., pressing down on a key while clicking a button); a touchscreen input may be an input from a touchscreen device (e.g., a finger motion, a stylus or pen motion); and a motion sensor input may be an input from a motion-sensing device (e.g., a bodily action or gesture). Thus, displaying a visual depiction of initiating the first action may comprise displaying a visual depiction of performing an outside activity. For example, if a user is using the macro module for a game and initiating an action in the game involved performing a motion sensor input such as spinning a remote control, then macro presenting device 113 may display a visual depiction of spinning the remote control on a screen.

In S607, macro presenting device 113 may then determine whether the selected mode involves implementation. If the selected mode involves implementation (S607: YES), then the process may proceed to S608. In S608, macro presenting device 113 may receive one or more inputs from the user. Specifically, macro presenting device 113 may wait for the user to initiate the first action by mimicking the visual depiction. In particular, mimicking the visual depiction may comprise performing the outside activity, which may communicate one or more inputs to the device that is running the application. After the user mimics the visual depiction, macro presenting device 113 may implement the first action in S609. In particular, macro presenting device 113 may implement the first action in response to receiving the one or more inputs from the user. As described above, the one or more inputs may comprise inputs that correspond to the outside activity performed by the user. The one or more inputs may also comprise an input to continue playing the particular macro.

If macro presenting device 113 determines that the selected mode does not involve implementation (S607: NO), then the process may proceed to S610. In S610, macro presenting device 113 may display a simulation of the application. The simulation of the application may be a copy or imitative representation of the application. Similar to the process involving implementation above, macro presenting device 113 may then wait for the user to initiate the first action in the simulation of the application. In particular, the user may mimic the visual depiction of initiating the first action in the simulation of the application. In S611, macro presenting device 113 may receive one or more inputs from the user which correspond to outside activity that is performed by the user. Then, in S612, macro presenting device 113 may implement the first action in the simulation of the application in response to receiving the one or more inputs.

Returning now to S602, if macro presenting device 113 determines that the selected mode is not interactive, then the process may proceed to S603. In S603, macro presenting device 113 may determine whether the selected mode involves implementation. If macro presenting device 113 determines that the selected mode involves implementation (S603: YES), then macro presenting device 113 may proceed to S604 and implement the first action. If macro presenting device 113 determines that the selected mode does not involve implementation (S603: NO), then macro presenting device 113 may proceed to S605 and display a visual depiction of implementing the first action.

Upon completing any one of S604, S605, S609, or S612, macro presenting device 113 may proceed to S613, where it may determine whether there is a next action recorded in the selected macro. If macro presenting device 113 determines that there is a next action recorded in the selected macro (S613: YES), then it may proceed back to S601 and repeat S602 through S612 for the next action. If macro presenting device 113 determines that there is no next action (S613: NO), then it may terminate the process.

Figure 11:
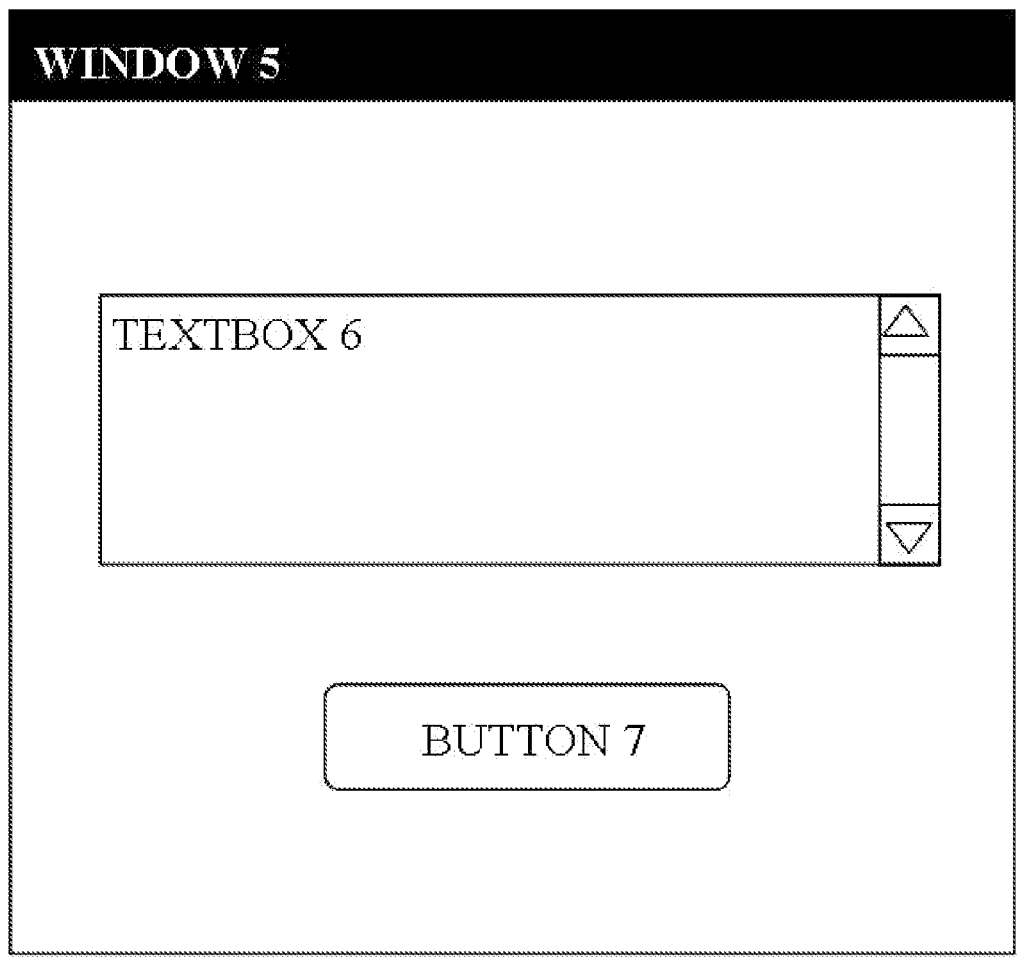
FIG. 11 depicts an example of an object in an application.

Referring to FIG. 11, an example of playing a macro in a selected mode now is described. FIG. 11 depicts an object, a window 5, in an application. Window 5 may comprise two items, a textbox 6 and a button 7. A user may record a macro that, when executed by a computer, may cause the computer to implement two actions. The first action may be placing a word, e.g., "yes," in textbox 6, and the second action may be saving the word in textbox 6. To initiate the first action, the user may have to perform a mouse and keyboard activity; and to initiate the second action, the user may have to perform a mouse activity. Specifically, to initiate the first action, the user may first single click on textbox 6 and then press down on several keys, e.g., a "Y" key, an "E" key, and an "S" key; and to initiate the second action, the user may single click on button 7.

Macro presenting device 113 may play the macro in one of four modes: an automatic implementation mode, an interactive implementation mode, a non-interactive demonstration mode, and an interactive demonstration mode. As described above, the automatic implementation mode may be a mode that is not interactive but involves implementation; the interactive implementation mode may be a mode that is interactive and involves implementation; the non-interactive demonstration mode may be a mode that is not interactive and does not involve implementation; and the interactive demonstration mode may be a mode that is interactive but does not involve implementation. If macro presenting device 113 is playing the macro in the automatic implementation mode, then it may select the first action, determine that the selected mode is not interactive, determine that the selected mode involves implementation, and implement the first action. In other words, macro presenting device 113 may select the first action and implement it, which involves placing the word in textbox 6. Macro presenting device 113 may then determine that there is a next action, namely, the second action. Macro presenting device 113 may repeat the same process for the second action.

If macro presenting device 113 plays the macro in the interactive implementation mode, then it may select the first action, determine that the selected mode is interactive, and display a visual depiction of initiating the first action. As described above, to initiate the first action, the user may have to single click on textbox 6 and then press down on several keys corresponding to the word. Thus, macro presenting device 113 may display a visual depiction of a mouse cursor moving to textbox 6, and clicking on textbox 6, a text cursor appearing in textbox 6, and several letters that correspond to the word appearing in textbox 6. To reduce confusion that the visual depiction of initiating the first action is implementing the first action, the visual depiction may be shown in colors that are different than the colors that are typically associated with the application. For example, the visual depiction may be in darker colors. Moreover, to draw attention to the mouse and keyboard activity that is being performed, one or more items or elements on the screen may be shown in a different color. For example, macro presenting device 113 may show the mouse cursor, the text cursor, and the textbox in a brighter color (e.g., yellow, red). After visually depicting the initiation of the first action, macro presenting device 113 may then determine that the selected mode involves implementation. Macro presenting device 113 may thus receive one or more inputs from the user and implement the first action in response to receiving the one or more inputs. The one or more inputs may comprise inputs that correspond to the mouse and keyboard activity performed by the user. Macro presenting device 113 may then determine that there is a next action, namely, the second action, and repeat the same process for the second action.

If macro presenting device 113 plays the macro in the non-interactive demonstration mode, then it may select the first action, determine that the selected mode is not interactive, determine that the selected mode does not involve implementation, and display a visual depiction of implementing the first action. Thus, macro presenting device 113 may select the first action and display a visual depiction of implementing it. For the first action, this may involve displaying that the word has been placed in textbox 6 but not actually placing the word in textbox 6. In other words, macro presenting device 113 may display a visual depiction of implementing the first action but not actually implement the first action. As in processes above, macro presenting device 113 may then determine that there is a next action, namely, the second action, and repeat this process for the second action.

Finally, if macro presenting device 113 plays the macro in the interactive demonstration mode, then it may select the first action, determine that the selected mode is interactive, and display a visual depiction of initiating the first action. As described above, this may involve displaying a visual depiction of a mouse cursor moving to textbox 6, and clicking on textbox 6, a text cursor appearing in textbox 6, and several letters that correspond to the word appearing in textbox 6. Macro presenting device 113 may then determine that the selected mode does not involve implementation and display a simulation of the application. The simulation of the application may comprise a second window 5 with a textbox 6 and a button 7. The user may initiate the first action in the simulation of the application, and macro presenting device 113 may receive one or more inputs from the user. In particular, the user may perform the mouse and keyboard activity in the simulation of the application, and macro presenting device 113 may receive one or more inputs that correspond to the mouse and keyboard activity. Similar to the process above involving the interactive implementation mode, to reduce confusion that the simulation of the application is the application itself, the simulation of the application may be shown in colors that are different than the colors that are associated with the application. For example, the simulation may be in darker colors. Macro presenting device 113 may then implement the first action in the simulation of the application. Thus, instead of implementing the first action in the application, macro presenting device 113 may implement the first action in the simulation of the application such that the first action is not actually implemented in the operating application. Same as the processes above, macro presenting device 113 may then determine that there is a next action, namely, the second action, and repeat this process for the second action.

The flowcharts and diagrams in FIGS. 1-11 illustrate the architecture, functionality, and operation of possible implementations of systems, methods, and computer program products according to various aspects of the present disclosure. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a," "an," and "the" are intended to comprise the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of means or step plus function elements in the claims below are intended to comprise any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. For example, this disclosure comprises possible combinations of the various elements and features disclosed herein, and the particular elements and features presented in the claims and disclosed above may be combined with each other in other ways within the scope of the application, such that the application should be recognized as also directed to other embodiments comprising other possible combinations. The aspects of the disclosure herein were chosen and described in order to best explain the principles of the disclosure and the practical application and to enable others of ordinary skill in the art to understand the disclosure with various modifications as are suited to the particular use contemplated.

What is claimed is:

1. A method comprising:
presenting, within an application, an integrated macro module, the integrated macro module integrated into the application;
receiving one or more search terms;
identifying, via a search element of the integrated macro module, a particular macro associated with at least one of the one or more search terms and stored in an accessible repository in response to receiving a request to search for a macro;
wherein the macro comprises a tutorial regarding use of the application;
presenting, via the search element, the particular macro;
wherein presenting, via the search element, the particular macro comprises at least one of:
displaying a header associated with the particular macro, and
playing the particular macro in a selected mode;
wherein the selected mode is selected from the group consisting of an automatic implementation mode, an interactive implementation mode, a non-interactive demonstration mode, and an interactive demonstration mode;
wherein playing the particular macro in the automatic implementation mode comprises implementing one or more actions;
wherein playing the particular macro in the interactive implementation mode comprises, for each of one or more actions:
displaying a visual depiction of initiating the action;
receiving one or more inputs from a user; and
implementing the action in response to receiving the one or more inputs;
wherein playing the particular macro in the non-interactive demonstration mode comprises displaying a visual depiction of implementing one or more actions; and
wherein playing the particular macro in the interactive demonstration mode comprises, for each of one or more actions:
displaying a visual depiction of initiating the action;
displaying a simulation of the application;
receiving one or more inputs from a user; and
implementing the action in the simulation of the application in response to receiving the one or more inputs.

2. The method of claim 1, further comprising:
receiving one or more further search terms;
recording, via a record element of the integrated macro module, a macro in response to receiving a request to record the macro; and
associating, via the record element, the macro with the one or more further search terms.

3. The method of claim 2, further comprising:
storing, via a publish element of the integrated macro module, the macro and the one or more further search terms in a local repository; and
storing, via the publish element, the macro and the one or more further search terms in a public repository in response to receiving a request to share the macro.

4. The method of claim 2, wherein recording, via the record element, a macro comprises:
receiving, via the record element, data on performing a task in the application, wherein the task comprises one or more actions;
organizing, via the record element, the one or more actions based on an order that the data is received; and
generating, via the record element, an instruction that, when executed by a computer, causes the computer to implement the one or more actions as organized.

5. The method of claim 3, further comprising:
presenting, via the publish element, one or more public repositories in response to receiving a request to share the macro;
wherein storing, via the publish element, the macro and the one or more further search terms comprises storing, via the publish element, the macro and the one or more search terms in a repository selected from the one or more public repositories.

6. The method of claim 1, wherein the one or more search terms comprise at least one of: a header, a key phrase, and a name of an object; and
wherein the accessible repository is selected from the group consisting of: a local repository, and a public repository.

7. The method of claim 1, further comprising ranking a plurality of distinct macros based on a predetermined scheme;
wherein identifying, via the search element, a particular macro comprises identifying, via the search element, the plurality of distinct macros, each of the plurality of distinct macros associated with at least one of the one or more search terms and stored in an accessible repository;
wherein presenting, via the search element, the particular macro comprises presenting, via the search element, the plurality of distinct macros as ranked.

8. The method of claim 1:
identifying, via an object help element of the integrated macro module, a related macro, the related macro associated with a name corresponding to an object and stored in an accessible repository; and
presenting, via the object help element, the related macro in response to receiving a request to view the related macro;
wherein the application comprises the object.

9. A computer program product comprising:
a computer readable storage medium having computer readable program code embodied therewith, the computer readable program code comprising:
computer readable program code configured to present, within an application, an integrated macro module, the integrated macro module integrated into the application;
computer readable program code configured to receive one or more search terms;
computer readable program code configured to identify, via a search element of the integrated macro module, a particular macro associated with at least one of the one or more search terms and stored in an accessible repository in response to receiving a request to search for a macro;
wherein the macro comprises a tutorial regarding use of the application; computer readable program code configured to present, via the search element, the particular macro;
wherein the computer readable program code configured to present, via the search element, the particular macro comprises at least one of:
computer readable program code configured to display a header associated with the particular macro, and
computer readable program code configured to play the particular macro in a selected mode;
wherein the selected mode is selected from the group consisting of an automatic implementation mode, an interactive implementation mode, a non-interactive demonstration mode, and an interactive demonstration mode;
wherein the computer readable program code configured to play the particular macro in the automatic implementation mode comprises computer readable program code configured to implement one or more actions;

wherein the computer readable program code configured to play the particular macro in the interactive implementation mode comprises, for each of one or more actions:

computer readable program code configured to display a visual depiction of initiating the action;

computer readable program code configured to receive one or more inputs from a user; and computer readable program code configured to implement the action in response to receiving the one or more inputs;

wherein the computer readable program code configured to play the particular macro in the non-interactive demonstration mode comprises computer readable program code configured to display a visual depiction of implementing one or more actions; and wherein the computer readable program code configured to play the particular macro in the interactive demonstration mode comprises, for each of one or more actions:

computer readable program code configured to display a visual depiction of initiating the action;

computer readable program code configured to display a simulation of the application;

computer readable program code configured to receive one or more inputs from a user; and computer readable program code configured to implement the action in the simulation of the application in response to receiving the one or more inputs.

10. The computer program product according to claim 9, further comprising:

computer readable program code configured to receive one or more further search terms;

computer readable program code configured to record, via a record element of the integrated macro module, a macro in response to receiving a request to record the macro; and computer readable program code configured to associate, via the record element, the macro with the one or more further search terms.

11. The computer program product according to claim 10, further comprising:

computer readable program code configured to store, via a publish element of the integrated macro module, the macro and the one or more further search terms in a local repository; and computer readable program code configured to store, via the publish element, the macro and the one or more further search terms in a public repository in response to receiving a request to share the macro.

12. The computer program product according to claim 10, wherein the computer readable program code configured to record, via the record element, a macro comprises:

computer readable program code configured to receive, via the record element, data on performing a task in the application, wherein the task comprises one or more actions;

computer readable program code configured to organize, via the record element, the one or more actions based on an order that the data is received; and computer readable program code configured to generate, via the record element, an instruction that, when executed by a computer, causes the computer to implement the one or more actions as organized.

13. The computer program product according to claim 11, further comprising:

computer readable program code configured to present, via the publish element, one or more public repositories in response to receiving a request to share the macro;

wherein the computer readable program code configured to store, via the publish element, the macro and the one or more further search terms comprises computer readable program code configured to store, via the publish element, the macro and the one or more further search terms in a repository selected from the one or more public repositories.

14. The computer program product according to claim 9, wherein the one or more search terms comprise at least one of: a header, a key phrase, and a name of an object; and wherein the accessible repository is selected from the group consisting of: a local repository, and a public repository.

15. The computer program product according to claim 9, further comprising:

computer readable program code configured to rank a plurality of distinct macros based on a predetermined scheme;

wherein the computer readable program code configured to identify, via the search element, a particular macro comprises computer readable program code configured to identify, via the search element, the plurality of distinct macros, each of the plurality of distinct macros associated with at least one of the one or more search terms and stored in an accessible repository;

wherein the computer readable program code configured to present, via the search element, the particular macro comprises computer readable program code configured to present, via the search element, the plurality of distinct macros as ranked.

16. The computer program product according to claim 9, further comprising:

computer readable program code configured to identify, via an object help element of the integrated macro module, a related macro, the related macro associated with a name corresponding to an object and stored in an accessible repository; and computer readable program code configured to present via the object help element, the related macro in response to receiving a request to view the related macro;

wherein the application comprises the object.

17. A computer program product comprising:

a computer readable storage medium having computer readable program code embodied therewith, the computer readable program code comprising:

computer readable program code configured to present, within an application, an integrated macro module, the integrated macro module integrated into the application;

computer readable program code configured to receive one or more search terms;

computer readable program code configured to record, via a record element of the integrated macro module, a macro in response to receiving a request to record the macro;

wherein the macro comprises a tutorial regarding use of the application;

computer readable program code configured to associate, via the record element, the macro with the one or more search terms;

computer readable program code configured to identify, via an object help element of the integrated macro module, a related macro, the related macro associated with a name corresponding to an object and stored in an accessible repository; and computer readable program code configured to present via the object help element, the related macro in response to receiving a request to view the related macro;

wherein the application comprises the object; and wherein the computer readable program code configured to present, via the search element, the particular macro comprises at least one of:

computer readable program code configured to display a header associated with the particular macro, and computer readable program code configured to play the particular macro in a selected mode;

wherein the selected mode is selected from the group comprising: an automatic implementation mode, an interactive implementation mode, a non-interactive demonstration mode, and an interactive demonstration mode;

wherein the computer readable program code configured to play the particular macro in the automatic implementation mode comprises computer readable program code configured to implement one or more actions;

wherein the computer readable program code configured to play the particular macro in the interactive implementation mode comprises, for each of one or more actions:

computer readable program code configured to display a visual depiction of initiating the action;

computer readable program code configured to receive one or more inputs from a user; and computer readable program code configured to implement the action in response to receiving the one or more inputs;

wherein the computer readable program code configured to play the particular macro in the non-interactive demonstration mode comprises computer readable program code configured to display a visual depiction of implementing one or more actions;

wherein the computer readable program code configured to play the particular macro in the interactive demonstration mode comprises, for each of one or more actions:

computer readable program code configured to display a visual depiction of initiating the action;

computer readable program code configured to display a simulation of the application;

computer readable program code configured to receive one or more inputs from a user; and computer readable program code configured to implement the action in the simulation of the application in response to receiving the one or more inputs.

18. The computer program product according to claim 17, further comprising:

computer readable program code configured to present, via the publish element, one or more public repositories in response to receiving a request to share the macro;

wherein the computer readable program code configured to store, via the publish element, the macro and the one or more search terms comprises computer readable program code configured to store, via the publish element, the macro and the one or more search terms in a repository selected from the one or more public repositories.

19. The computer program product according to claim 17, wherein the one or more search terms comprise at least one of: a header, a key phrase, and a name of an object.

20. The computer program product according to claim 17, wherein the computer readable program code configured to record, via the record element, the macro comprises:

computer readable program code configured to receive, via the record element, data on performing a task in the application, wherein the task comprises one or more actions;

computer readable program code configured to organize, via the record element, the one or more actions based on an order that the data is received; and computer readable program code configured to generate, via the record element, an instruction that, when executed by a computer, causes the computer to implement the one or more actions as organized.

21. The computer program product according to claim 17, further comprising:

computer readable program code configured to store, via a publish element of the integrated macro module, the macro and the one or more search terms in a local repository; and computer readable program code configured to store, via the publish element, the macro and the one or more search terms in a public repository in response to receiving a request to share the macro.

* * * * *